United States Patent [19]

Brailean et al.

[11] Patent Number: 5,717,463
[45] Date of Patent: Feb. 10, 1998

[54] METHOD AND SYSTEM FOR ESTIMATING MOTION WITHIN A VIDEO SEQUENCE

[75] Inventors: James C. Brailean, Park Ridge, Ill.; Taner Ozcelik, San Jose, Calif.; Aggelos K. Katsaggelos, Chicago, Ill.

[73] Assignee: Motorola, Inc., Schaumburg, Ill.

[21] Appl. No.: 505,992

[22] Filed: Jul. 24, 1995

[51] Int. Cl.$^6$ .................................................. H04N 7/36
[52] U.S. Cl. .............................................. 348/416; 348/699
[58] Field of Search ..................................... 348/416, 699, 348/700; H04N 7/36

[56] References Cited

U.S. PATENT DOCUMENTS

| | | | |
|---|---|---|---|
| 4,727,422 | 2/1988 | Hinman | 348/416 |
| 4,771,331 | 9/1988 | Bierling | 348/396 |
| 4,989,087 | 1/1991 | Pele | 348/416 |
| 5,351,095 | 9/1994 | Kerdranvat | 348/699 |
| 5,500,685 | 3/1996 | Kokaram | 348/699 |

OTHER PUBLICATIONS

"Image Sequence Compression Using a Pel-Recursive Motion-Compensated Technique" Robert J. Moorhead II, Sarah a. Rajala, and Lawrence W. Cook, IEEE Journal on Selected Areas in Communications, vol., SAC-5, No. 7, Aug., 1987, pp. 1100–1114.

"The Efficiency of Motion-Compensating Prediction for Hybid Coding of Video Sequences" Bernd Girod, IEEE Journal on Selected Areas in Communications, vol. SAC-5, No. 7, Aug., 1987, pp. 1140–1154

"Improvements of Transform Coding Algorithm for Motion-Compensated Interframe Prediction Errors—DCT/SQ Coding" Masahide Kaneko, Yosinori Hatori and Atsushi Koike, IEEE Journal on Selected Areas in Communications, vol. SAC-5, No. 7 Aug., 1987.

"Gradient-Based Algorithms for Block-Oriented MAP Estimation of Motion and Appplication to Motion-Compensated Temporatl Interpolation" Claude Bergeron and Eric Dubois, IEEE Transactions on Circuits and Systems for Video Technology, vol. 1, No. 1, Mar., '91 pp. 72–85.

"Use of Colour Information in Bayesian Estimation of 2-D Motion" Janusz Konrad and Eric Dubois, INRS-Telecommunications, M17.23, pp. 2205–2208.

"Motion-Compensated Filtering of Time-Varying Images" Eric Dubois, INRS-Telecommruincations, May, 1991, pp. 103–131.

"Comparison of Stochastic and Deterministic Solution Methods in Bayesian Estimation of 2D Motion", Janusz Konrad and Eric Dubois, INRS-Telecommunications, vol. 9, No.4, Aug., 1991,pp. 215–228.

"Low Bit Rate Video Coding Using Robust Motion Vector Regeneration in the Decoder" Mark R. Banham, James C. Brailean, Cheuk L. Chan, Aggelos K. Katsaggelos, IEEE Transactions on Immage Processing, vol. 3, No. 5, Sep., 1994, pp. 652–665.

"An Asaptive Regularize Recursive Displacement Estimation Algorithm", Serafim N. Efstratiadis, Aggelos K. Katsaggelos, IEEE Transactions on Image Procesing, vol. 2, No. 3, Jul., 1993, pp. 341–352.

(List continued on next page.)

Primary Examiner—Howard W. Britton
Attorney, Agent, or Firm—Darleen J. Stockley

[57] ABSTRACT

A method and system for estimating the motion within a video sequence provides very accurate estimates of both the displacement vector field, as well as, the boundaries of moving objects. The system comprises a preprocessor (102), a spatially adaptive pixel motion estimator (104), a motion boundary estimator (106), and a motion analyzer (108). The preprocessor (102) provides a first estimate of the displacement vector field, and the spatially adaptive pixel motion estimator (104) provides a first estimate of object boundaries. The motion boundary estimator (106) and the motion analyzer (108) improve the accuracy of the first estimates.

23 Claims, 7 Drawing Sheets

OTHER PUBLICATIONS

"Image Segmentation Based on Object Oriented Mapping Parameter Extimation" Michael Hotter and Robert Thoma, Signal Processing 15 (1988) pp. 315–344.

":Object–Oriented Motion Estimation and Segmentation in Image Sequences" Norbert Diehl, Signal Processing: Image Communications 3 (1990) pp. 23–56.

"Object–Oriented Analysis–Synthesis coding of Moving Images" Hans Georg Musmann, Michael Hotter and Jorn Ostermann, Signal Processing, Image Communications (1980) 117–135.

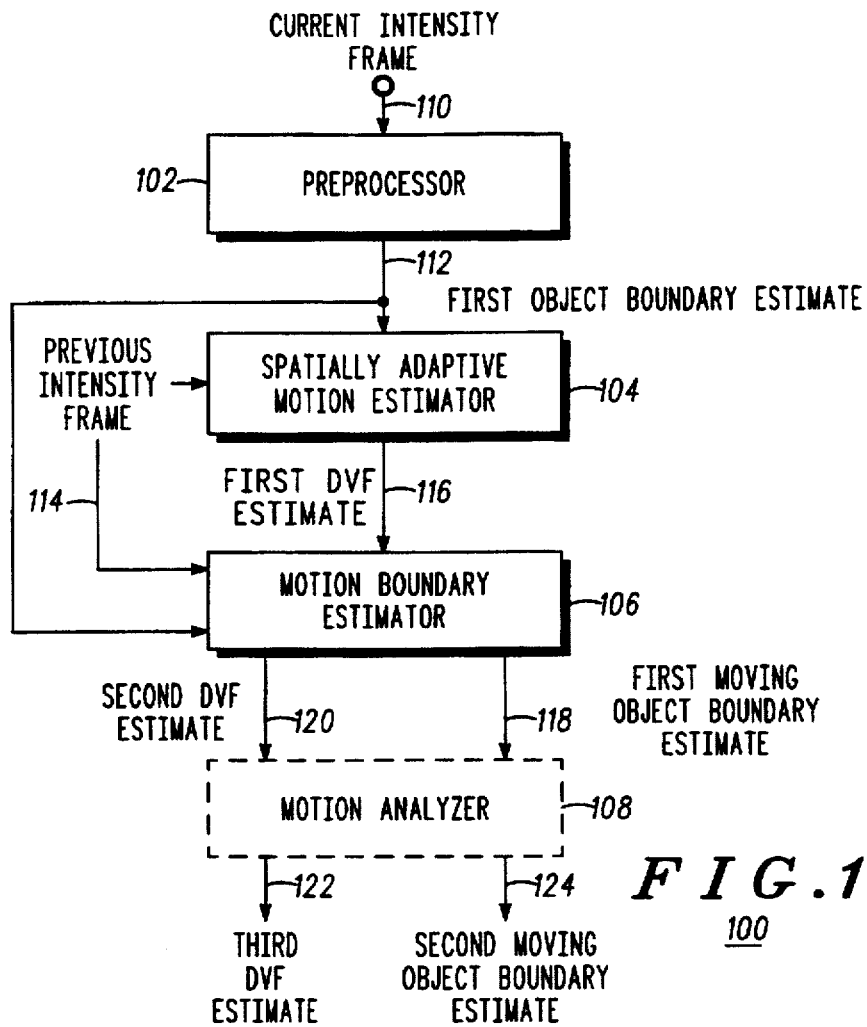

700

800

METHOD AND SYSTEM FOR ESTIMATING MOTION WITHIN A VIDEO SEQUENCE

FIELD OF THE INVENTION

The present invention relates generally to video coding, and more particularly to using motion estimation in video coding.

BACKGROUND OF THE INVENTION

A video sequence consists of temporally sampled projections of a three dimensional, 3-D, scene onto the two dimensional, 2-D, image plane. The 3-D motion that occurs within this scene is captured as 2-D displacements of these projections. The displacement of a particular picture element, pixel, in the current 2-D image plane, may be represented by a vector which points to the location of the particular pixel in a previous image plane. The displacement vector field, DVF, describes the motion of all pixels between a given set of image planes, and therefore represents the 3-D motion of objects projected onto the image plane.

Accurate estimation of the DVF within a video sequence is crucial in many applications of image sequence processing. Video coding, frame interpolation, object tracking, and spatio-temporal motion compensated filtering are all applications that require accurate estimation of the DVF to utilize the interframe correlation that exists in a video sequence.

Compression of digital video to a very low bit rate, VLBR, is a very important problem in the field of communications. In general, a VLBR is considered not to exceed 64 kilo-bits per second (Kbps) and is associated with existing personal communication systems, such as the public switch telephone network and cellular systems. To provide services like video on demand and video conferencing on these systems, would require the information contained in a digital video sequence to be compressed by a factor of 300 to 1. To achieve such large compression ratios, requires that all redundancy present in a video sequence be removed.

Current standards, such as H.261, MPEG1, and MPEG2 provide compression of a digital video sequence by utilizing a block motion-compensated Discrete Cosine Transform, DCT, approach. This video encoding technique removes the redundancy present in a video sequence by utilizing a two-step process. In the first step, a block-matching, BM, motion estimation and compensation algorithm estimates the motion that occurs between two temporally adjacent frames. The frames are then compensated for the estimated motion and compared to form a difference image. By taking the difference between the two temporally adjacent frames, all existing temporally redundancy is removed. The only information that remains is new information that could not be compensated for in the motion estimation and compensation algorithm.

In the second step, this new information is transformed into the frequency domain using the DCT. The DCT has the property of compacting the energy of this new information into a few low frequency components. Further compression of the video sequence is obtained by limiting the amount of high frequency information encoded.

The majority of the compression provided by this approach to video encoding is obtained by the motion estimation and compensation algorithm. That is, it is much more efficient to transmit information regarding the motion that exists in a video sequence, as opposed to information about the intensity and color. The motion information is represented using vectors which point from a particular location in the current intensity frame to where that same location originated in the previous intensity frame. For BM, the locations are predetermined non-overlapping blocks of equal size. All pixels contained in these blocks are assumed to have the same motion. The motion vector associated with a particular block in the present frame of a video sequence is found by searching over a predetermined search area, in the previous temporally adjacent frame for a best match. This best match is generally determined using the mean-squared-error (MSE) or mean-absolute-difference (MAD) between the two blocks. The motion vector points from the center of the block in the current frame, to the center of the block which provides the best match in the previous frame.

Utilizing the estimated motion vectors, a copy of the previous frame is altered by each vector to produce a prediction of the current frame. This operation is referred to as motion compensation. As described above, the predicted frame is subtracted from the current frame to produce a difference frame which is transformed into the spatial frequency domain by the DCT. These spatial frequency coefficients are quantized and entropy encoded providing further compression of the original video sequence. Both the motion vectors and the DCT coefficients are transmitted to the decoder, where the inverse operations are performed to produce the decode video sequence.

The estimation of the DVF within a video sequence is an extremely difficult problem. The two main sources of the difficulties in obtaining accurate estimates are the nonstationarity of the DVF and the ill-posed nature of the problem. The ill-posedness results from the violation of Hadamard's definition of a well-posed problem, which is characterized by the existence of a solution, the uniqueness of a solution, and the continuity of a solution. The problem of estimating the displacement field violates all three of these properties. Objects moving in an image sequence will occlude certain areas and uncover others; at these locations the DVF is undefined and no solution exists. Object deformation and changes in the camera's depth of field can also result in regions where the DVF is undefined. For a given image sequence, many displacement fields may satisfy the data and thus the solutions are not unique. The continuity property is also violated, since in some image sequences even slight modifications in the local intensity values can cause large changes in the magnitude and/or direction of the displacement estimate. The fact that the DVF estimation problem is ill-posed, must be taken into account if any useful results are to be obtained.

The nonstationarity of the DVF results from objects moving along different trajectories within the scene that causes discontinuities to occur at the object boundaries, as well as from regions where the motion is undefined due to covered or uncovered pans of the moving scene. The nonstationarity of the DVF implies that any approach used in its estimation, must be adaptable. That is, approaches which assume stationarity will result in estimates of the DVF that distort the boundaries between differently moving objects. These distortions in the motion boundaries result directly in distorted objects, and therefore an increase in the entropy of the difference image.

The assumption used by BM that the motion within a block is constant, effectively constrains the problem of estimating the DVF so that the problem is no longer ill-posed. However, this same assumption also requires that if the motion boundaries are to be preserved they must coincide with the block boundaries. Since in real sequences this rarely occurs, significant errors in the estimation of the DVF result at the boundaries. Such errors can be described as a blurring of the boundaries of the DVF. For example, if a block contains a moving object and stationary background, then depending on the size of the object either part of the stationary background will be displaced or the moving object will be treated as stationary background. In either case, the motion compensated block of the previous frame will be a poor prediction of the block in the present frame, resulting in a DFD image with increased entropy.

Another approach for estimating the DVF which has recently gained in popularity is the spario-temporal gradient approach. Spatio-temporal gradient-based motion estimation algorithms are derived by minimizing the displaced frame difference, DFD, at each pixel using a temporal gradient and spatial gradient in the previous frame, based on an initial estimate of the DVF. One common approach to carry out this minimization is that of first linearizing the DFD using a prediction of the DVF. By assuming that all the pixels in a neighborhood of the working point undergo the same motion, a set of linear equations results, instead of a single equation. If the neighborhood allows recursive computability, then algorithms resulting from this approach are generally referred to as pixel recursive, PR, motion estimators. PR algorithms are generally faster than BM algorithms, and do not require spatial interpolation for subpixel accuracy, although PR algorithms may require spatial interpolation to compute the spatial gradients in the previous frame along the direction of motion. Furthermore, PR algorithms can be extended to handle more complicated types of motion than the purely translational type.

Similar to block matching, the performance of PR algorithms also suffers at the boundaries separating differently moving objects. That is, at these motion boundaries, pixels in the local neighborhood do not undergo similar motion. By assuming that they do, PR algorithms produce inaccurate estimates near these boundaries. As in the case of block matching, the poor estimates of the DVF near these boundaries will result in a marked increase in the entropy of the DFD.

There are several major problems with both block matching and spatio-temporal gradient approaches. For instance, the assumption that the motion within a block or local neighborhood is homogeneous results in severe degradation of the boundaries within the DVF. Block matching algorithms can not resolve within a single block complicated types of motion, such as rotations. Also, they require spatial interpolation for sub-pixel accuracy. Spario-temporal gradient approaches suffer from the fact that the linearization of the DFD is extremely dependent on the initial prediction of the DVF. These difficulties result in an increase in the DFD's entropy, which is prohibitive for very low bitrate coding applications. A very low bitrate is defined as a rate less than 64 kbits/sec.

Therefore, a need exists for a method and system for accurately estimating motion within a video sequence. The method and system are required to regularize the estimation of the displacement vector field, DVF, to combat ill-posedness and estimate the boundaries or discontinuities that exist within the DVF.

BRIEF DESCRIPTION OF THE DRAWINGS

FIG. 1 is a diagram of a preferred embodiment of a system for estimating motion in accordance with the present invention.

FIG. 2 is a diagram of a preferred embodiment of a preprocessor in accordance with the present invention.

DETAILED DESCRIPTION OF THE PREFERRED EMBODIMENTS

Figure 3:
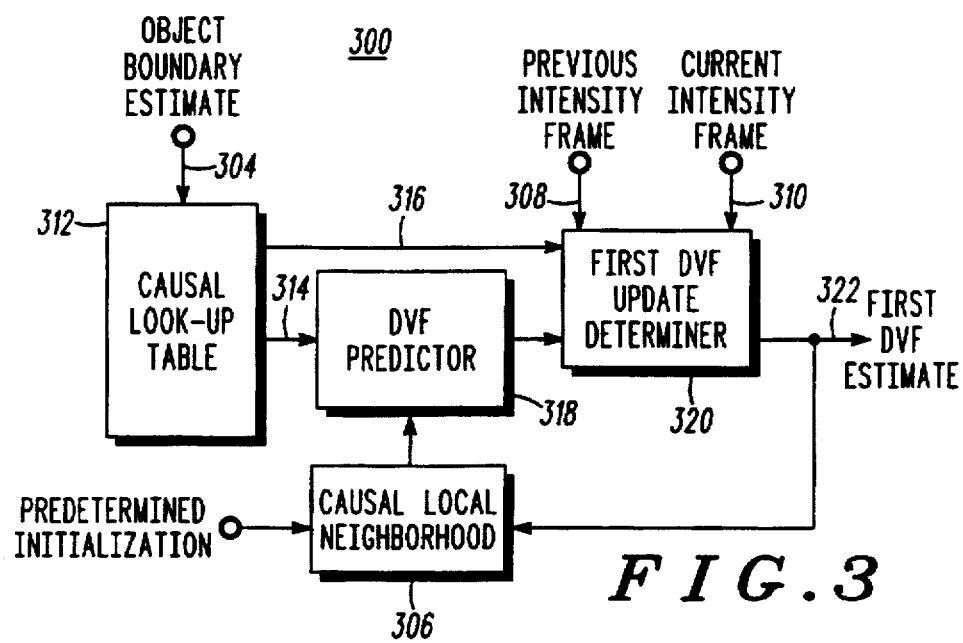
FIG. 3 is a diagram of a preferred embodiment of a spatially adaptive motion estimator in accordance with the present invention.

The present invention provides a method for obtaining very accurate estimates of both the displacement, as well as, the boundaries of the moving objects within a video sequence. Therefore, the problems of ill-posedness and nonstationarity of the boundaries are solved simultaneously. An estimate of the object boundaries within a video sequence is obtained through the segmentation of the present image frame into regions of similar intensity. The boundaries separating these regions are considered to be the boundaries of the objects within the sequence. This object boundary information is used to determine a first estimate of the DVF.

Utilizing the first estimate of the DVF, a first estimate of the object boundaries is obtained with the accuracy of the location of each boundary improved, as well as, the removal of any boundary found in the estimate to be non-moving. Based on this estimate of the moving object boundaries, a second and improved estimate of the DVF is also determined. As a final step the second estimate of the DVF and the estimated moving object boundaries are further refined based on a predetermined model of the DVF. Such models typically take into account complicated types of motion, such as object rotations in the field of view and apparent object motion due to changes in the camera focal length or position. The third estimate of the DVF and the second estimate of the moving object boundaries are the result of fitting such a model to the second estimate of the DVF and the moving object boundary estimate.

FIG. 1, numeral 100, is a diagram of a preferred embodiment of a system for estimating motion in accordance with the present invention. The system includes a preprocessor (102), a spatially adaptive motion estimator (104), a motion boundary estimator (106), and a motion analyzer (108). The preprocessing section (102) provides a object boundary estimate (112) of a current intensity frame (110), $f_k$, at time instant k. Based on this object boundary estimate (112), the current intensity frame (110), $f_k$, and a previous intensity frame (114), $f_{k-1}$, the spatially adaptive motion estimator (104) provides a first DVF estimate (116), $\bar{d}_k$. The DVF characterizes the motion within the scene that occurs during the time separating frames $f_k$ and $f_{k-1}$. Both the first DVF estimate (116) and the object boundary estimate (112) are further refined in the motion boundary estimator (106) and motion analyzer (108). Specifically, using the first DVF estimate (116), $\bar{d}_k$, the motion boundary estimator (106) refines the object boundary estimate (112), eliminating the intensity boundaries which do not correspond to motion boundaries. The output of the motion boundary estimator (106) is the first moving object boundary estimate (118), $\hat{I}_k$, and represents only the boundaries of objects that are moving within the video sequence. Also, inaccuracies in the first DVF estimate (116) are removed in the motion boundary estimator (106) resulting in the second DVF estimate (120), $\tilde{d}_k$. These inaccuracies are generally due to the corruption of the input video sequence with noise. The motion analyzer (108) further refines both estimates, $\tilde{d}_k$ and $\hat{I}_k$, using modeling approaches based on the principles of object motion. The third DVF estimate (122), $\hat{d}_k$, and the second moving object boundary estimate (124), $\tilde{I}_k$, represent extremely accurate estimates of the DVF and the moving object boundaries, respectively.

FIG. 2, numeral 200, s a diagram of a preferred embodiment of a preprocessor in accordance with the present invention. The system includes an order statistics filter (202) and an object boundary estimator which is comprised of a object grower (206), and a object merger (206). The major function of the preprocessing step is to provide the spatially adaptive motion estimator (104) with an accurate segmentation of the current intensity frame (210) into regions or objects. To achieve this goal, a copy of the current intensity frame $f_k$ (210) is first filtered separately using an order statistics filter (202). This operation is performed to remove any small objects from the sequence prior to segmentation. These smaller objects, which are in general the result of illumination changes in the video sequence and not a true object, can degrade the spatially adaptive motion estimator's (104) ability to accurately estimate the motion in that object.

A filter which is typically used to remove smaller objects from an image frame is a 7×7 median filter. This filter is described by the following operation $$y_k(i,j) = \text{median}\{f_k(i-3, j-3), f_k(i-3, j-2), \ldots, f_k(i+3, j+2), f_k(i+3, j+3)\}$$

where $y_k(i,j)$ is the filtered version of $f_k(i,j)$. The filtered output (212), $y_k(i,j)$, is the median value of $f_k(i,j)$ (210) and its 49 nearest spatial neighbors. Any objects with a spatial support, or size, that is less than 7×7 are removed by this filter. As discussed in the paragraph above, these smaller objects must be removed prior to the segmentation of the image frame to avoid degradation to the accuracy of the resulting segmentation.

The object boundaries contained in the filtered output (212) are estimated using a two-step process (204). The first step (206) is called object growing, wherein each pixel is compared to its neighbors. Based on this comparison, the pixel is classified as either belonging to the same object as its neighbors, or to a new object. The test used to determine the classification of pixel (i,j) is given by $$|y_k(i,j) - y_k(i-m, j-n)| \leq T \quad (1)$$

where m and n can take on the values of $\{-1, 0, 1\}$. The threshold T is used to determine whether $y_k(i,j)$ is a member of the same object as $y_k(i-m, j-n)$. If the absolute value of the difference between two neighboring pixels, $|y_k(i,j) - y_k(i-m, j-n)|$, is less than the threshold T, then pixel (i,j) is classified as a member of the same object as pixel (i-m, j-n). This object is denoted as Obj(i-m, i-n). If the difference is greater than T, then pixel (i,j) is considered not to be a member of Obj(i-m, i-n). For the case when the neighbors of (i,j) have not all been classified or $y_k(i,j)$ is determined to not be a member of the neighboring objects, than pixel (i,j) is classified as the initial pixel of a new object.

The threshold T is typically fixed to a predetermined value. A drawback of this approach is that this value is dependent upon the particular image to be segmented. An approach which removes this dependency is described by the following expression $$y_k(i,j) \in \text{Obj}(i-m, i-n) \iff \begin{cases} y_k(i,j) \leq \text{MIN} + T_1 \\ \text{and} \\ y_k(i,j) \geq \text{MAX} - T_1 \end{cases} \quad (2)$$

where MIN and MAX are the maximum and minimum intensity values contained within Obj(i-m, i-n) and $T_1$ is again a predetermined parameter. After each pixel is classified as belonging to a specific object, the maximum and minimum values of that object are tested to determine if an adjustment is needed. The tests and adjustments are the following $$\text{if}(y_k(i,j) \leq \text{MIN}), \rightarrow \text{MIN} = y_k(i,j),$$

and $$\text{if}(y_k(i,j) \geq \text{MAX}), \rightarrow \text{MAX} = y_k(i,j). \quad (3)$$

This operation has the effect of providing an adjustable window for each object that can adapt to any particular intensity frame. Typically, the predetermined value for the threshold $T_1$ is 25. This method for adjusting the window, i.e. thresholds, is extremely effective at proving a consistent segmentation over a wide variety of video sequences.

The second step of the object boundary estimation process, each object is tested to determine whether it should be merged with a neighboring object or not. The pixels residing along the border of an object are compared with the pixels on the borders of the neighboring objects. If the difference between these border pixels is small, then the objects are merged. Specifically, the following test is conducted on the border pixels of two neighboring objects $$\text{if}(|y_k(i,j) - y_k(i-m, j-n)| \leq T_2) \rightarrow \text{merge}(\text{Obj}(i,j) \text{ \& Obj}(i-n, j-m)), \quad (4)$$

where $T_2$ is a predetermined parameter typically set to a value of 30.

A second comparison is also performed in an attempt to again guard against the creation of small objects. These smaller objects are generally the result of gradually varying illumination changes which the object growing algorithm interprets as object boundaries. This test compares the size of an object, i.e. the number of pixels contained in an object, to a third predetermined threshold. If the number of pixels is less than this predetermined threshold, than the object is merged with a neighboring object. This merging operation is performed using the neighboring object which is the most similar to the current object. The amount of similarity between two neighboring objects is measured using the border differences described in Equation (4). Typically, the size threshold is set at 256 pixels. The object merging operation (208) is effective at removing smaller objects which may have been formed during object growing operation.

An advantage of this two-step object boundary estimation approach (204), as opposed to other segmentation approaches, is that it is guaranteed to provide boundaries that are continuous and closed. For the application of motion estimation and analysis this is a very important result, since we know that in general the objects within a video sequence are defined by a continuous and closed boundary. Furthermore, the boundaries contained in an intensity frame are a super-set of the corresponding DVF boundaries. Therefore, the boundaries or discontinuities present in the DVF are also continuous, closed, and well defined.

The output of the preprocessing unit (102) is the object boundary estimate (216) $S_k$. The object boundary estimate (216) $S_k$ assigns each pixel in $y_k(i,j)$ (212) a value corresponding to the object it is a member of. The boundary is retrieved from (216) $S_k$ by determining where the object numbering changes. The object boundary $S_k$ (216) combined with the present intensity frame $f_k$ (110) and the previous intensity frame $f_{k-1}$ (114), are used by the spatially adaptive motion estimation unit (104) to determine the first estimate of the DVF $\bar{d}_k$ (116). As discussed above, the object boundary estimate $S_k$ (112) contains the discontinuities of the DVF $d_k$, and therefore, is considered as the first estimate of the boundaries between differently moving objects. The first or initial estimate of the line process, $S_k$, is used as the mechanism by which the spatially adaptive motion estimation algorithm adapts to these discontinuities.

FIG. 3, numeral 300, is a diagram of a preferred embodiment of a spatially adaptive motion estimator in accordance with the present invention. The spatially adaptive motion estimation unit (104) comprises a causal look-up table (312), a DVF predictor device (318), and an update circuit (320). The inputs to the spatially adaptive motion estimation unit are the estimate object boundaries $S_k$ (304), a predetermined causal local neighborhood of past displacement estimates $d_k$ (306), the previous intensity frame $f_{k-1}$ (308), and a current intensity frame $f_k$ (310). The causal look-up causal look-up table device (312) stores a set of predetermined autoregressive, AR, prediction coefficients (314), and corresponding prediction uncertainties (316).

The predetermined set of causal AR prediction coefficients (314) and corresponding uncertainty terms (316) are typically found empirically. Generally, a least squares estimation approach is used on either a prototype or previously estimated DVF. Based on the object boundary estimation $S_k$ (304) a subset of the predetermined AR prediction coefficients (314), $a(m,n|S_k)$, and a corresponding uncertainty term, $w(i,j|S_k)$ (316), are chosen from the look-up table (312) for use in the DVF predictor (318) and update circuit (320). The DVF predictor circuit determines a prediction of the DVF based on the subset of AR prediction coefficients (314) and a local neighborhood of displacement vectors (306). The prediction operation is described by the following equation $$\bar{d}_k(i,j) = \sum_{i,j \in R} a(m,n|S_k) \bar{d}_k(i-m, j-n), \tag{5}$$

where $\bar{d}_k$ (i,j) is the prediction of the motion occurring at pixel location r≡(i,j) in the current image frame, and $a(m, n|S_k)$ are the AR prediction coefficients with a local support R.

The local neighborhood R consists of the following pixel locations: the pixel in the column directly to the left (i,j−1), the pixel in the row above and the column to the left (i−1; d−1), the pixel in the row above (i−1,j), and the pixel in the row above and the column to the right (i−1 ,j+1). It should be noted that the choice of R is made at the time of implementation and is dependent on the method used to navigate through the two dimensional data sets used to represent the image and displacement information at a particular time instant. For this particular R, it is assumed that the data is access from left to right across each row, starting with the top row. Other methods for navigating through the image and displacement data can also be used. This would require a slight modification to the local neighborhood R, however the operations would remain the same.

As described by Equation (5) and discussed above, if the object boundary estimate (304) $S_k$ indicates that an object boundary is present in a predetermined local neighborhood R, the AR coefficients $a(m,n|S_k)$ (314) are adapted so as not to include in the prediction any displacement vectors belonging to another object. The non-stationary assumption on which the above equation is based, is valid throughout the DVF and results in consistently accurate predictions. The inaccuracies incurred by a stationary model due to the mixing or blurring of displacement vectors located near the object boundaries, is alleviated.

The predicted displacement vector $\bar{d}_k(i,j)$ (324), the associated uncertainty term $w(i,j|S_k)$ (316), the previous intensity frame $f_{k-1}$ (308), and current intensity frame $f_k$ (310) are inputs to the first DVF update circuit (320). The first DVF update circuit updates the predicted displacement vector $\bar{d}_k$ (i,j) (324) resulting in the first DVF estimate (322).

Figure 4:
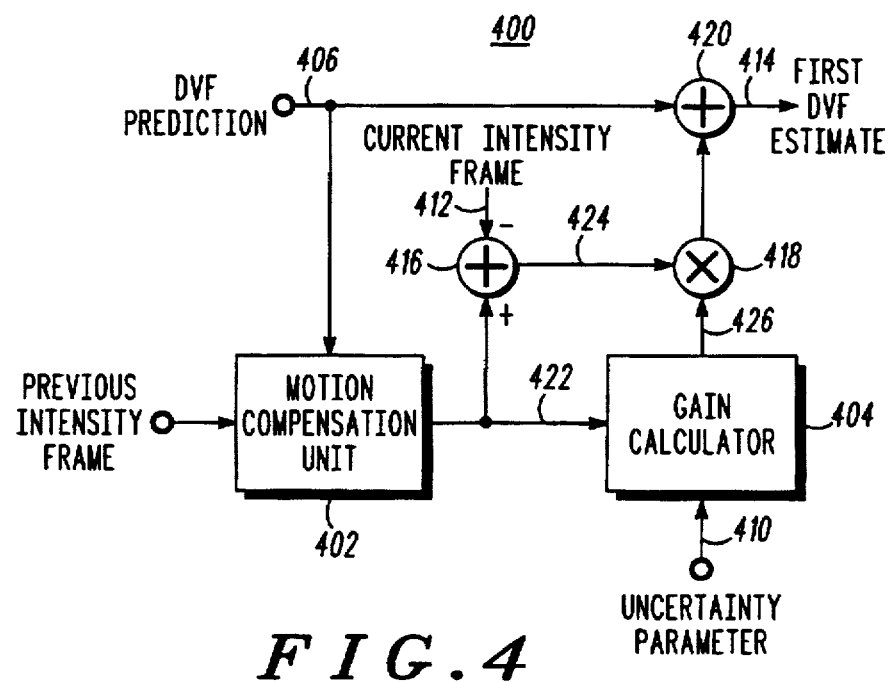
FIG. 4 is a diagram of a preferred embodiment of a first DVF update circuit in accordance with the present invention.

FIG. 4, numeral 400, is a diagram of a preferred embodiment of a first DVF update determiner in accordance with the present invention. The first update circuit comprises a motion compensation unit (402) and a gain calculator unit (404). The motion compensation operation performed by the motion compensation unit (402) is a nonlinear operation which is described by the following equation $$\tilde{f}_k(r) = f_{k-1}(r - \bar{d}_k(r)), \tag{2}$$

where $\tilde{f}_k(r)$ (422) is the motion compensated previous frame. The value $f_{k-1}(r-\bar{d}_k(r))$ (422) is found by taking the intensity value of the pixel located spatially at $r-\bar{d}_k(r)$ in the previous frame $f_{k-1}$ (408). The motion compensated value $\tilde{f}_k(r)$ (422) is subtracted from the value of the pixel at location (r) in the current frame $f_k(r)$ (412) resulting in the displaced frame difference, DFD, signal (424), $e_k(i,j)$. The DFD (424) signal is an error signal which is related to the accuracy of the predicted displacement vector $\bar{d}_k(i,j)$. The DFD signal $e_k(i,j)$ (424) is multiplied by a gain term (426) and added to the DVF prediction (406) resulting in the first estimate DVF estimate (414).

The gain determined by the gain calculator unit (404) is used to scale the DFD signal $e_k(r)$ (424) prior to updating the DVF prediction (406)$\bar{d}_k(r)$. The expression used to calculate the gain is found by linearizing the motion compensated frame about the spatial location $(r-\bar{d}_k(r)-u(r))$, where $u(r)$ is the error in the prediction$\bar{d}_k(r)$, (406) and solving for the best linear estimate of $u(r)$. The resulting expression for the gain, $K(i,j)$, (426) is given by $$K(i,j) = [G^T(i,j)G(i,j) + w(i,j)]^{-1} G(i,j)$$

where $G(i,j)$ is a n×2 matrix of spatial gradients evaluated in the motion compensated previous frame (422) for each pixel in the local neighborhood R. Specifically, for the local neighborhood R described above, $G(i,j)$ is given by $$G(i,j) = \begin{bmatrix} \nabla \tilde{f}_k(i,j) \\ \nabla \tilde{f}_k(i,j-1) \\ \nabla \tilde{f}_k(i-1,j-1) \\ \nabla \tilde{f}_k(i-1,j) \\ \nabla \tilde{f}_k(i-1,j+1) \end{bmatrix}$$

where $$\nabla \tilde{f}_k(i,j) = \begin{bmatrix} \frac{df}{dx} \\ \frac{df}{dy} \end{bmatrix}$$

is the two dimensional spatial gradient evaluated at pixel location (i,j) in the motion compensated previous frame (422) $f_{k-1}(r-\bar{d}_k(r))$.

As mentioned above, the gain K(i,j) (426) determined by the gain calculator is used to the scale the DFD signal (424). This scaled DFD signal is added to the predicted displacement vector (406), $\bar{d}_k(i,j)$, resulting in the first estimate of the DVF (414),$\bar{d}_k(i,j)$. The operation used to update $\bar{d}_k(i,j)$ is described in more detail in the following equation $$\bar{d}_k(i,j) = \bar{d}_k(i,j) + K(i,j) \cdot E(i,j),$$

where E(i,j) is the DFD evaluated for each pixel in the local neighborhood R.

Figure 5:
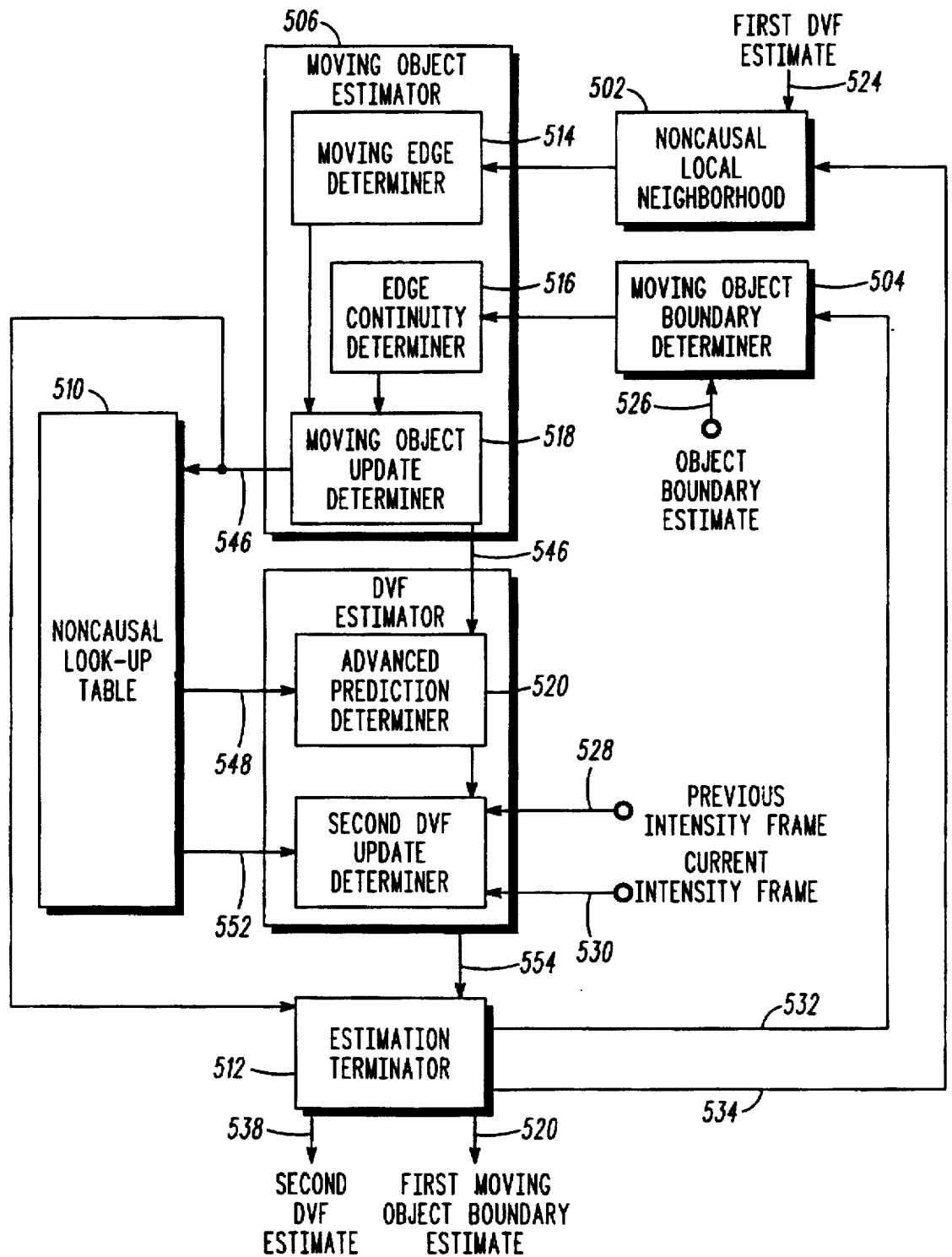
FIG. 5 is a diagram of a preferred embodiment of a motion boundary estimator in accordance with the present invention.

FIG. 5, numeral 500, is a diagram of a preferred embodiment of a motion boundary estimator in accordance with the present invention. The motion boundary estimation unit (106) comprises a noncausal look-up table (510), a moving object boundary estimator (506), a DVF estimator (508), a noncausal local neighborhood of the DVF (502), and a moving object boundary estimator (506). The inputs to the moving boundary estimator are the object boundary estimate $S_k$ (526), the first DVF estimate $\bar{d}_k$ (524), the previous intensity frame $f_{k-1}$ (528), and a current intensity frame $f_k$ (530). The moving object boundary unit (504) stores the current estimate of the moving object boundary for possible use in an iterative solution. Specifically, the solution provided by the moving object boundary estimator (506) can be used as an initial condition for an improved solution. A method for carrying out this iteration is discussed below. The moving object boundary estimator (506) is initialized with the object boundary estimate (526).

The moving object boundary estimator (506) provides an estimate of the moving object boundaries $\bar{I}_k$ (546) based on the object boundary $S_k$ (526) and the corresponding first estimate of the DVF (524). The moving object boundary estimator (506) is comprised of a moving edge determiner unit (514), edge continuity unit (516), and a moving object update unit (518). The estimate of the moving object boundaries, $\bar{I}_k$ (546), is determined by adjusting the first estimate $S_k$. These adjustments, which are based on known statistical properties of these boundaries and characterized through the use of confidence measures, result in the removal of boundaries that do not belong to a moving object. The particular confidence measures used are described in detail below. As mentioned above, the moving object boundary estimator (506) is initialized with the object boundary estimate (526).

The moving edge determiner unit (514) evaluates whether or not pixel (i,j) is part of a moving object boundary and assigns a confidence measure to the current estimate $\bar{I}_k(i,j)$. This evaluation is performed by comparing adjacent displacement vectors. More specifically, the evaluation and corresponding confidence measure (540) are given by $$D(i,j) = (d_k(i,j) - d_k(i,j-1))^2 + (d_k(i,j) - d_k(i-1,j))^2,$$

If confidence measure D(i,j) (540) is large, then a moving object boundary is likely to exist. Conversely, if D(i,j) (540) is small, than the likelihood is small that a moving object boundary exists.

Similar to the moving edge determiner unit (514), the edge continuity unit (516) also assigns a confidence measure (542) to the current estimate of the moving object boundary at pixel (i,j). This confidence measurement (542) however, is a function of the values of the neighboring boundary elements. Based on the assumption that objects within a video scene have boundaries that lie on a closed continuous curve, a pixel (i,j) is a boundary element, if and only if, it lies on such a curve. In other words, if pixel (i,j) is determined to be a moving boundary element, than the adjacent pixels in a particular direction most also be boundary elements. The above characterization is captured in the following expression $$C(i,j) = 0.5(l(i,j) + l(i-1,j) + l(i,j-1)).$$

The moving object update determiner adjusts the moving object boundary estimate $\bar{I}_k(i,j)$, at pixel (i,j), based on the current estimate of the moving object boundary, which is initially the object boundary estimate (526) $S_k(i,j)$, and the confidence measure D(i,j) (5 4)and C(i,j) (542). The expression which characterizes the moving object boundary update determiner is given by $$\bar{I}(i,j) = \frac{1}{1 + \exp(L(i,j))}$$

where $$L(i,j) = \beta(\alpha[(1-\epsilon \cdot C(i,j)) + (1-S_k(i,j))] - \lambda^2 D(i,j)),$$

The coefficients $\alpha$ and $\lambda$ are predetermined parameters used to control the amount that each confidence measure can influence the estimate $\bar{I}_k$. The parameter $\beta$ (556) is used to control the response of the update determiner. If $\beta$ is small, then the effect of the confidence measures on the adjusted $\bar{I}_k(i,j)$ is also small. If on the other hand $\beta$ is large, then the adjusted $\bar{I}_k(i,j)$ is dominated by the confidence measure. Typically, the estimation of $\bar{I}_k$ and $\bar{d}_k$ is done iteratively, with $\beta$ being initialized to a small value and increased slowly at the beginning of each new iteration. The decision to increase $\beta$ and to refine the estimates of $\bar{I}_k(i,j)$ and $\bar{d}_k(i,j)$ is made in the estimation terminator (516). The estimation termination circuit (514) is discussed in more detail below.

The DVF estimation determiner (508) is comprised of an advanced prediction determiner (520) and a second DVF update determiner (522). Similar to the DVF predictor (318) described above, the advanced predictor (520) provides a prediction of the DVF based on the moving object boundary estimate (536). Utilizing this moving object boundary estimate (546) $\bar{I}_k(i,j)$, a subset of the predetermined noncausal AR prediction coefficients, $b(m,n|\bar{I}_k)$ (548), and a corresponding uncertainty term, $v(i,j|\bar{I}_k)$ (552), are chosen from the non-causal look-up table (510) for use in the advanced predictor (520) and second DVF update determiner (522). The advanced predictor (520) determines a prediction of the DVF based on the subset of AR prediction coefficients (548) and a local neighborhood of displacement vectors ℜ. It should be noted that the local neighborhood $\mathcal{R}$ is different from the R used by the DVF predictor (318). This difference comes from the fact that a complete estimate of the DVF already exists. Therefore, the dependence on the scan that exists for the DVF predictor is not an issue for the advanced predictor. In other words, the restriction to use a neighborhood that contains only previously estimated displacement vectors is no longer necessary. The local neighborhood $\mathcal{R}$ includes the nearest neighbor pixels surrounding (i,j). Specifically, $\mathcal{R}$ includes the following pixels, (i,j−1), (i,j+1), (i−1,j), (i+1,j). In addition to the model described by Equation (5) the advanced predictor also utilizes a rigid body assumption to further constrain the prediction. The rigid body assumption specifies that all pixels within an object undergo similar motion.

The advantage of combining this additional constraint with the AR model described in Equation. (5), is that a probabilistic characterization of the DVF can be derived in the form of an A Posterjori probability density function. The advanced prediction unit determines a prediction of the displacement vector $\ddot{d}_k(i,j)$ that maximizes the A Posteriori function. Typically, this maximization process is performed using the following iterative algorithm $$\ddot{d}_k^{n+1}(i,j) = \ddot{d}_k^{n+1}(i,j) - \theta \left[ \ddot{d}_k^n(i,j) - \frac{1}{\lambda^2 \left( 1 - \sum_{m,n \in R} a(m,n) l_k(i,j) \right)} [\ddot{d}_k^n(i,j) - \lambda^2 \Delta(i,j)] \right]^n,$$

where $$\Delta = -\mu[D(i,j)(1-l(i,j)) + D(i+1,j)(1-l(i+1,j))],$$

ν is the correction step size, i.e., it is equivalent to a steepest descent minimization step, and n is the iteration number. The initial condition used to begin the iteration is $\ddot{d}_k^0 = \ddot{d}_k$. Since the first DVF estimate $\ddot{d}_k$ is of high quality, the improvement resulting from iterating is small. Generally, the number of iterations performed is fixed to 1. However, a criterion that monitors the percent change between iterations can also be used to terminate the iteration. More specifically, if $$\frac{\sum_{i,j} \|\ddot{d}_k^{n+1}(i,j) - \ddot{d}_k^n(i,j)\|^2}{\sum_{i,j} \|\ddot{d}_k^{n+1}(i,j)\|^2} \times 100 \leq T$$

the iteration is terminated. Typically, the threshold T is set to $10^{-3}$. Again due to the quality of the first DVF estimate the correction step size is fixed to a value of 0.1.

The prediction $\ddot{d}_k(i,j)$ provided by the advanced prediction unit (520) is updated by the second DVF update determiner (522) to produce the second DVF estimate $\tilde{d}_k$ (534). The second DVF update determiner (522) the same update method as described for the first DVF update circuit (320).

As discussed above, the coupled solution for $\tilde{d}_k$ (534) and $\tilde{l}_k$ (532) is typically solved using an iterative process. That is, steps used to obtain both $\tilde{l}_k$ and $\tilde{d}_k$ are repeated using the previous results as the initial conditions. Furthermore, β is increased after each iteration providing more weight to the confidence measures. By iterating the overall accuracy of both $\tilde{l}_k$ and $\tilde{d}_k$ is improved. The decision whether to perform another iteration or not, is determined in the iteration terminator (516). The iteration terminator utilizes a termination criteria similar the one used by the second DVF estimator (510). That is, the number of iterations set to a fixed number or it can determined based on the percent change between iterations. Typically, a maximum number of 3 iterations is set. However, if the percent change between iterations is below a threshold the iteration is terminated. The specific, if the following is true $$\frac{\sum_{i,j} \|\tilde{d}_k^{n+1}(i,j) - \tilde{d}_k^n(i,j)\|^2}{\sum_{i,j} \|\tilde{d}_k^{n+1}(i,j)\|^2} \times 100 \leq T_d,$$

and $$\frac{\sum_{i,j} \|\tilde{l}_k^{n+1}(i,j) - \tilde{l}_k^n(i,j)\|^2}{\sum_{i,j} \|\tilde{l}_k^{n+1}(i,j)\|^2} \times 100 \leq T_l,$$

the iteration is terminated.

Figure 6:
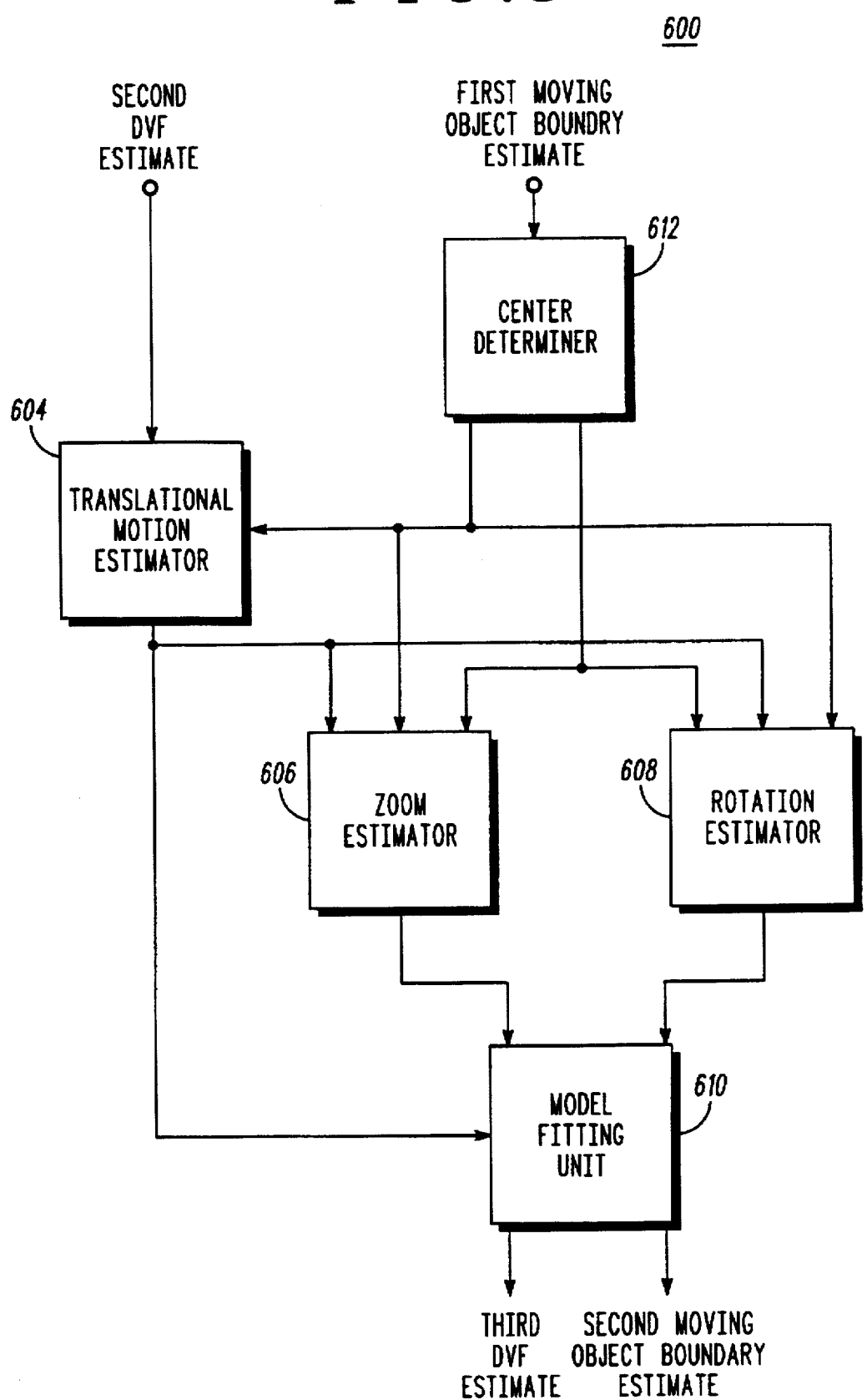
FIG. 6 is a diagram of a preferred embodiment of a motion analyzer in accordance with the present invention.

FIG. 6, numeral 600, is a diagram of a preferred embodiment of a motion analyzer in accordance with the present invention. The motion analyzer which provides a parameterized representation of the DVF using $\tilde{d}_k$ and $\tilde{l}_k$ as inputs. The motion analyzer comprises a memory device (614), translational motion estimator (604), zoom estimator (606), rotation estimator (608), and a object labeler and center determiner (612). The second estimates of the DVF $\tilde{d}_k$ and line process $\tilde{l}_k$ are the inputs to the motion analyzer unit. Based on these inputs and a four parameter motion model, a third and final set of estimates of the DVF and line process is determined.

The four parameter motion model characterizes the DVF by utilizing, as rigid bodies, the objects defined by the line process. Specifically, the displacement of each pixel contained within a particular object is characterized by the following the expression $$d_k(i,j) = t_k(i, j|Obj(i,j)) + Z(Obj(i,j)) \cdot cp(i, j|Obj(i,j)) + \theta(Obj(i,j)) \cdot cp(i, j|Obj(i,j))$$

where $t_k(i,j|Obj(i,j)) = [t_{x,k}(i,j|Obj(i,j)), t_{y,k}(i,j|Obj(i,j))]^T$ is a vector representing the translational motion component of $d_k(i,j)$, while $Z(Obj(i,j))$ and $\theta(Obj(i,j))$ represent the zoom and rotation components. It is important to note that four parameters four parameters is dependent upon the object, $Obj(i,j)$, assigned. Furthermore, the term $cp(i,j|Obj(i,j))$ represents the distance from the center of $Obj(i,j)$ to the pixel (i,j). The position of each object's center is located by the object center determiner (612). Based on the estimate $\tilde{l}_k$, the center of each object is determined to be the intersection of the two lines which contain the maximum and minimum horizontal and vertical pixel locations in $Obj(i,j)$.

The translational motion estimator determines the translational motion component for each object. This is accomplished by averaging the horizontal and vertical displacement components over each object. Specifically, the translational components $t_{x,k}$ and $t_{y,k}$ are calculated using the following expressions $$t_{x,k}(i,j|Obj(i,j)) = \frac{1}{N} \sum_{i,j \in Region(i,j)} d_{x,k}(i,j)$$

and $$t_{y,k}(i,j|Obj(i,j)) = \frac{1}{N} \sum_{i,j \in Region(i,j)} d_{y,k}(i,j)$$

where N is the total number of pixels contained within Obj(i,j).

The zoom estimator (606) estimates the zoom parameter Z(Obj(i,j)). This parameter is used to characterized any changes that may occur in an object's focal length. These changes may be caused by the camera or by the motion of the object closer to or away from the camera location. Utilizing the dense DVF, $d_k(i,j)$, the zoom parameter Z(Obj(i,j)) is estimated for object Obj(i,j) using the following expression $$Z(i,j|Obj(i,j)) = \frac{1}{N} \sum_{i,j \in Obj(i,j)} \Gamma^{-1}(i,j) \cdot \{(i - cx(i,j)) \cdot$$

$$(d_{x,k}(i,j) - t_{x,k}(i,j|Obj(i,j))) + (j - cy(i,j)) \cdot (d_{y,k}(i,j) - t_{y,k}(i,j|Obj(i,j)))\}$$

where cx(i,j) and cy(i,j) represent the horizontal and vertical indices of the center for the object which includes pixel (i,j) and $\Gamma(i,j)=(i-cx(i,j))^2+(j-cy(i,j))^2$.

The rotation estimator (608) estimates the rotation parameter θ(Obj(i,j)) for each object. The rotation parameter is used to characterize any rotation that may occur in an object. These rotations are generally the result of object motion and are estimated in a manner similar to that used to determine Z(Obj(i,j)). Specifically, the rotation parameter θ(Obj(i,j)) is estimated using the following expression $$\theta(i,j|Obj(i,j)) = \frac{1}{N} \sum_{i,j \in Obj(i,j)} \Gamma^{-1}(i,j) \cdot \{-(j-cy(i,j)) \cdot$$

$$(d_{x,k}(i,j) - t_{x,k}(i,j|Obj(i,j))) + (i - cx(i,j)) \cdot (d_{y,k}(i,j) - t_{y,k}(i,j|Obj(i,j)))\}$$

As mentioned above, this four parameter representation of the DVF is very useful in applications that require object manipulation.

As a final step, the parameterized representation of the DVF is used to refine estimate of the line process $\tilde{l}_k$. Based on the four motion parameters, each object is compared with its neighboring objects. If an object is determined to be similar to a neighboring region they are merged to form a single region. Two regions are determine to be similar if the following four conditions are met:

$(t_{x,k}(i,j|Region(i,j))-t_{x,k}(i+n,j+m|Region(i+n,j+m)))^2 \leq P_1$, Condition 1.

$(t_{y,k}(i,j|Region(i,j))-t_{y,k}(i+n,j+m|Region(i+n,j+m)))^2 \leq P_2$, Condition 2.

$(Z(i,j|Region(i,j))-Z(i+n,j+m|Region(i+n,j+m)))\leq P_3$ Condition 3.

$(\theta(i,j|Region(i,j))-\theta(i+n,j+m|Region(i+n,j+m)))\leq P_4$, Condition 4.

where (i+n,j+m) indicates the location of the neighboring region Obj(i+n,j+m).

Figure 7:
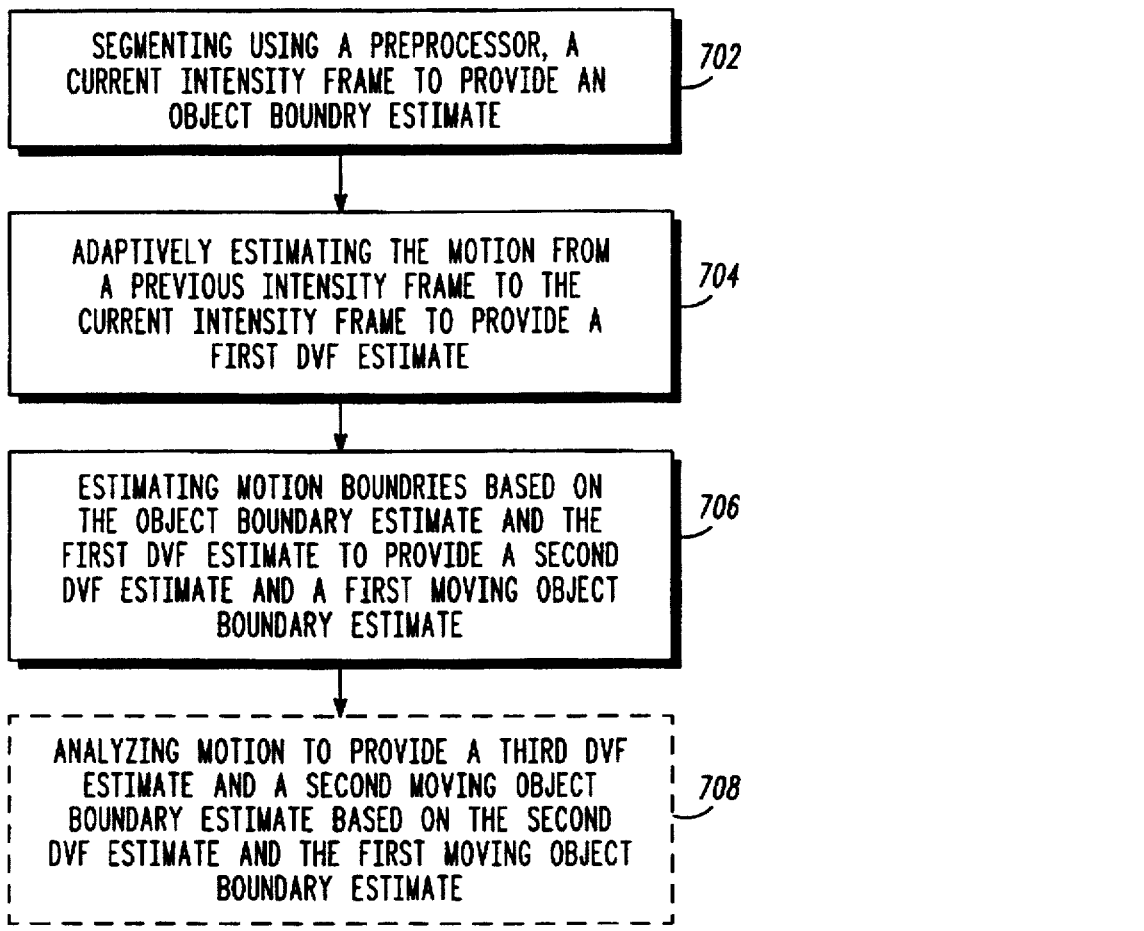
FIG. 7 is a flow diagram of steps for implementing a preferred embodiment of a method for estimating motion in accordance with the present invention.

FIG. 7, numeral 700 is a flow diagram of steps for implementing a preferred embodiment of a method for estimating motion in accordance with the present invention. The current intensity frame is segmented (702) using a preprocessor to determine the boundaries of the objects contained in the scene captured by the video sequence. These boundaries are used by the spatially adaptive motion estimator (704) to adapt to objects that are moving differently in the video sequence. A first estimate of the DVF is provided by the spatially adaptive motion estimator (704). Based on the estimator of the object boundaries and the first estimate of the DVF, a first estimate of the moving object boundaries and a second estimate of the DVF are obtained (706). Analyzing and modelling the first estimate of the moving object boundaries and the second estimate of the DVF provides a third estimate of the DVF and a second estimate of the moving object boundaries.

Figure 8:
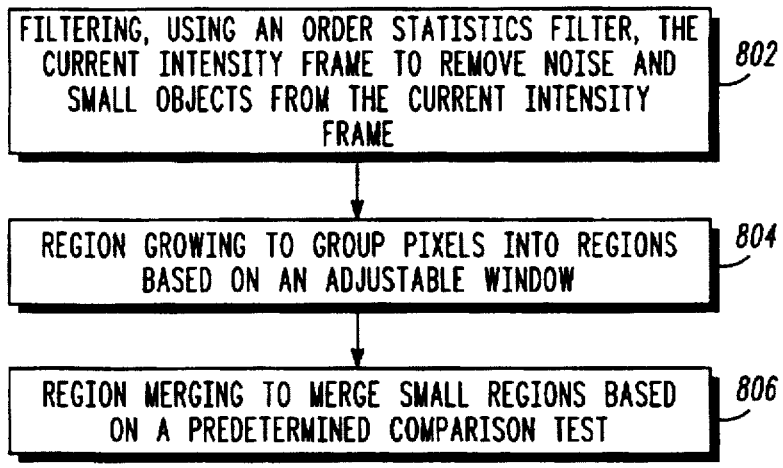
FIG. 8 is a flow diagram of steps for implementing a preferred embodiment of a method for segmenting in accordance with the present invention.

FIG. 8, numeral 800, is a flow diagram of steps for implementing a preferred embodiment of a method for segmenting in accordance with the present invention. The first step is to remove noise from the image frame by filtering using an order statistics filter (802). Next pixels are grouped into objects using a region grower (804). The final step includes merging small objects into larger ones using a region merger and a predetermined comparison test (806).

Figure 9:
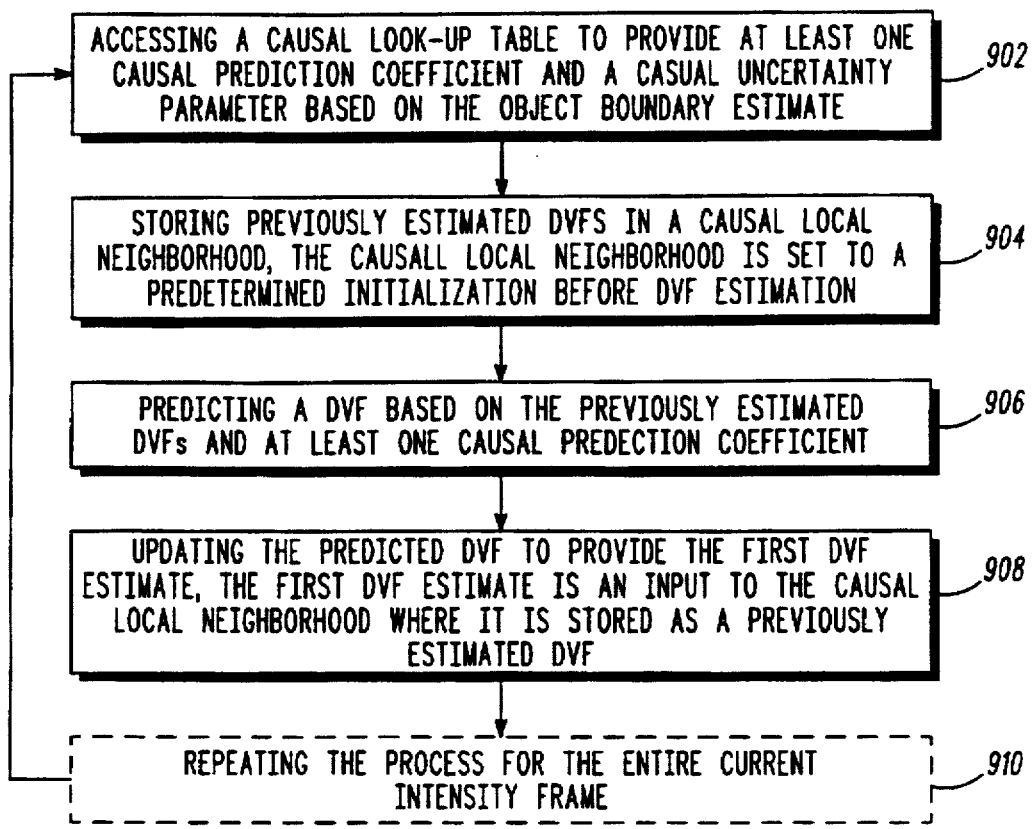
FIG. 9 is a flow diagram of steps for implementing a preferred embodiment of a method for adaptively estimating motion in accordance with the present invention.

FIG. 9, numeral 900, is a flow diagram of steps for implementing a preferred embodiment of a method for adaptively estimating motion in accordance with the present invention. First, based on the object boundary estimate, a causal look-up table is accessed to provide at least one causal prediction coefficient and a causal uncertainty parameter (902). Next, from a memory device containing previously estimated displacement vectors, a causal local neighborhood is set to a predetermined initialization (904). A prediction of the current displacement vector is determined next, based on the previously estimated displacement vectors and at least one causal prediction coefficient (906). The predicted displacement vector is updated to become the first displacement estimate and is stored in the causal local neighborhood (908). The process is repeated for the entire current intensity frame (910) resulting in the first estimate of the DVF.

Figure 10:
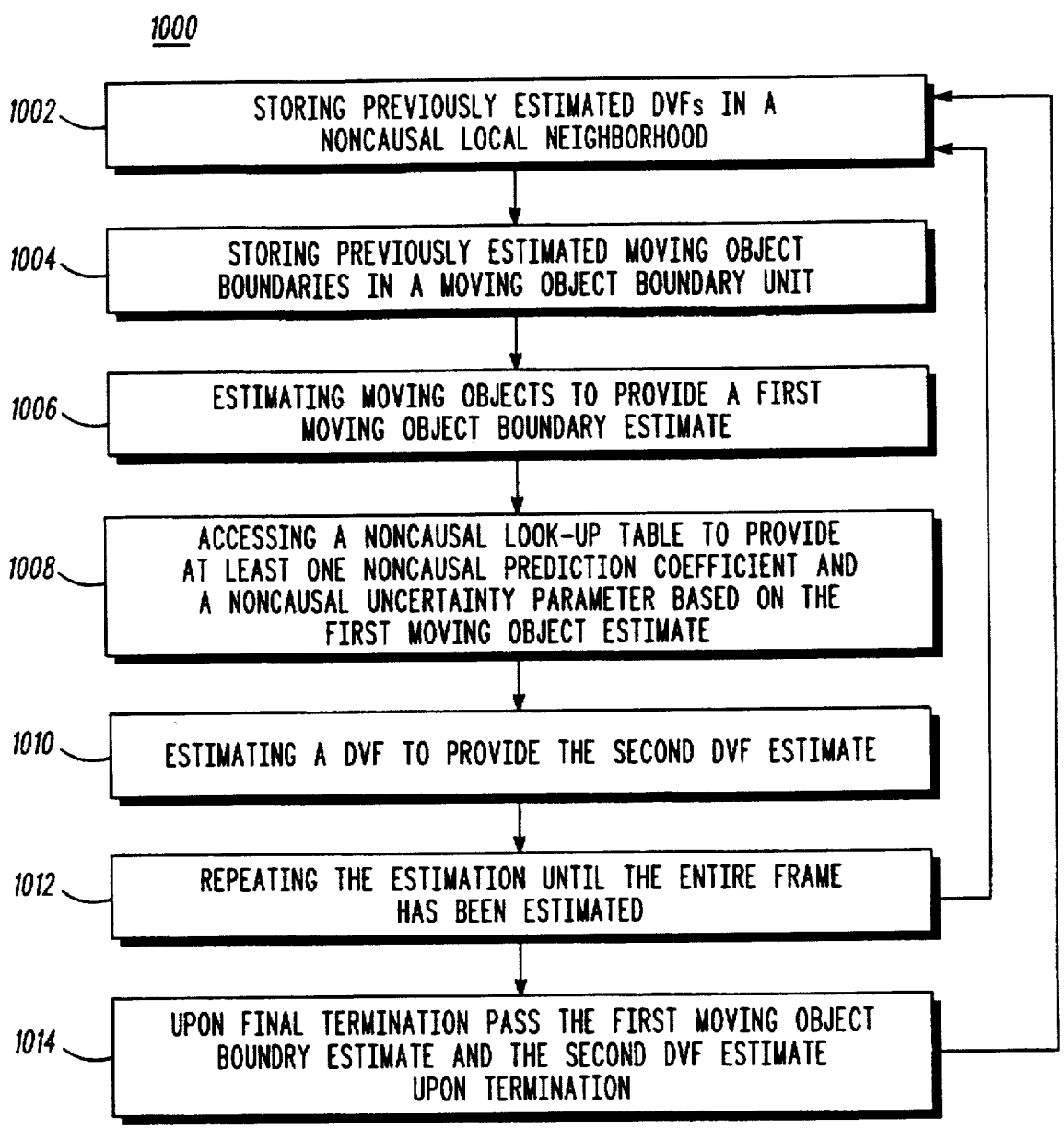
FIG. 10 is a flow diagram of steps for implementing a preferred embodiment of a method for estimating motion boundaries in accordance with the present invention.

FIG. 10, numeral 1000, is a flow diagram of steps for implementing a preferred embodiment of a method for estimating motion boundaries in accordance with the present invention. The first estimate of the DVF and the previously estimated displacement vectors of the second estimated DVF are stored in the noncausal local neighborhood memory (1002). The previously estimated object boundaries are stored in the moving object boundary determiner (1004). Utilizing the object boundaries and the previously estimated displacement vectors a first estimate of the moving object boundaries is determined (1006). Based on the first estimate of the moving object boundaries, a noncausal look-up table is accessed to provide at least one noncausal prediction coefficient and a noncausal uncertainty parameter (1008). A second estimate of the current displacement vector is determined next, based on the previously estimated displacement vectors, at least one noncausal prediction coefficient and the DVF update determiner (1010). This estimation process is repeated until all pixels in the current intensity frame have a displacement vector associated with them (1012). The process is terminated when the percent total change in the second estimate of the DVF and the moving boundary estimate are below a set of thresholds (1014).

Figure 11:
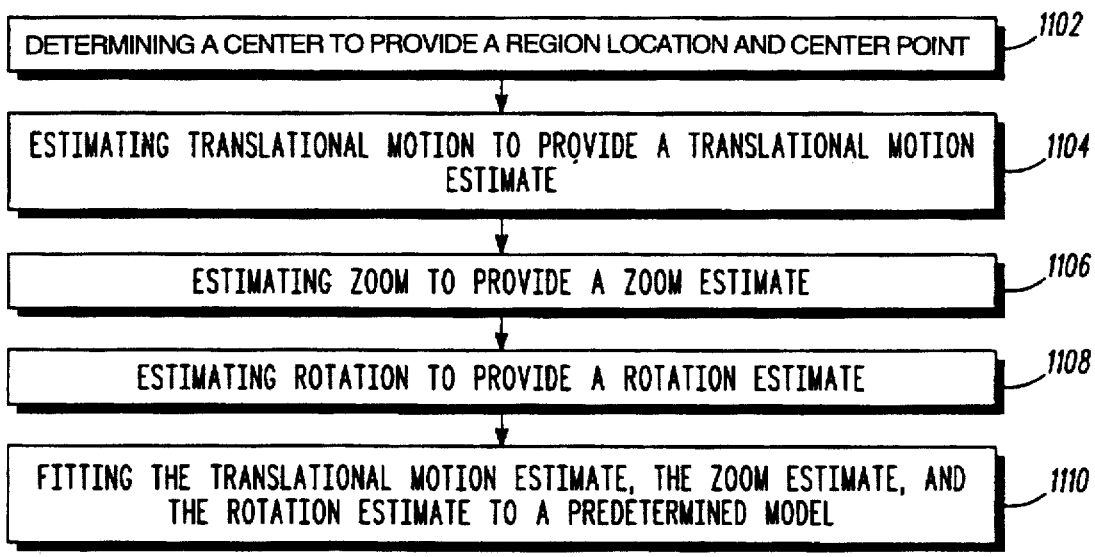
FIG. 11 is a flow diagram of steps for implementing a preferred embodiment of a method for analyzing motion in accordance with the present invention.

FIG. 11, numeral 1100, is a flow diagram of steps for implementing a preferred embodiment of a method for analyzing motion in accordance with the present invention. First a center for each object is determined (1102). Next, an estimate of the translational motion is determined for each object (1104). This is followed by the estimation of a zoom parameter for each object (1106). An estimate of a rotation parameter is also determined for each object (1108). Finally, the translation, rotation, and zoom parameters are used in fitting a model to the estimated DVF (1110).

The system described in FIGS. 1 through 6 may be implemented in various embodiments, such as Application Specific Integrated Circuit, ASIC, Digital Signal Processor, DSP, Gate Array, GA, and any tangible medium of/for a computer.

We claim:

1. A system for estimating motion, comprising:
   A) a preprocessor, operably coupled to receive a current intensity frame, for segmenting the current intensity frame to provide a first object boundary estimate;
   B) a spatially adaptive motion estimator, operably coupled to the preprocessor and operably coupled to receive the current intensity frame and a previous intensity frame, for providing a first DVF estimate, wherein DVF represents displacement vector field; and
   C) a motion boundary estimator operably coupled to the spatially adaptive motion estimator and preprocessor and operably coupled to receive the current intensity frame and the previous intensity frame, for providing a second DVF estimate and a first moving object boundary estimate.

2. The system of claim 1 wherein the system is embodied in a Digital Signal Processor, DSP.

3. The system of claim 1 wherein the system is embodied in an Application Specific Integrated Circuit, ASIC.

4. The system of claim 1 wherein the system is embodied in a gate array.

5. The system for estimating motion according to claim 1, wherein:
   the preprocessor includes:
      an order statistics filter, coupled to receive the current intensity frame, for removing noise and small objects from the current intensity frame; and
      an object boundary estimator, coupled to the order statistics filter, for providing the object boundary estimate;
   the spatially adaptive motion estimator includes:
      a causal look-up table, coupled to receive the object boundary estimate, for providing at least one causal prediction coefficient and a causal uncertainty parameter based on the object boundary estimate;
      a causal local neighborhood for storing previously estimated DVFs, the causal local neighborhood is set to a predetermined initialization before DVF estimation;
      a DVF predictor, coupled to the causal look-up table and the causal local neighborhood, for providing a DVF prediction based on the previously estimated DVFs and at least one causal prediction coefficient; and
      a first DVF update determiner, coupled to receive the DVF prediction, the causal uncertainty parameter, the current intensity frame and the previous intensity frame, for providing the first DVF estimate, the first DVF estimate is an input to the causal local neighborhood where it is stored as a previously estimated DVF;
   the motion boundary estimator includes:
      a noncausal local neighborhood for storing previously estimated DVFs, the noncausal local neighborhood is initialized by the first DVF estimate;
      a moving object boundary unit for storing previously estimated moving object boundaries, the moving object boundary unit is initialized by the object boundary estimate;
      a moving object estimator, coupled to the noncausal local neighborhood and the moving object boundary unit, for providing a first moving object boundary estimate;
      a noncausal look-up table, coupled to the moving object estimator, for providing at least one noncausal prediction coefficient and a noncausal uncertainty parameter based on the first moving object boundary estimate;
      a DVF estimator, coupled to the moving object estimator and the noncausal look-up table, for providing the second DVF estimate; and
      an estimation terminator coupled to the moving object estimator and the DVF estimator, for passing the first moving object boundary estimate and the second DVF estimate upon termination;
      wherein the first moving object boundary estimate is an input to the moving object boundary unit and the second DVF estimate is an input to the noncausal local neighborhood.

6. The system for estimating motion according to claim 5, wherein:
   the object boundary estimator in the preprocessor includes a region grower that groups pixels into regions based on an adjustable window and a region merger that merges small regions based on a predetermined comparison test.

7. The system for estimating motion according to claim 1, further comprising:
   D) a motion analyzer, operably coupled to the motion boundary estimator, for providing a third DVF estimate and a second moving object boundary estimate based on the second DVF estimate and the first moving object boundary estimate.

8. The system for estimating motion according to claim 7, wherein:
   the motion analyzer includes:
      a center determiner, coupled to receive the first moving object boundary estimate, for providing a region location and a center point;
      a translational motion estimator, coupled to receive the second DVF estimate and the center point, for providing a translational motion estimate;
      a zoom estimator, coupled to receive the center point, the region location, and the translational motion estimate, for providing a zoom estimate;
      a rotation estimator, coupled to receive the center point, the region location, and the translational motion estimate, for providing a rotation estimate; and
      a model fitting unit, coupled to the translational motion estimator, the zoom estimator, and the rotation estimator, for providing the third DVF estimate and the second moving object boundary estimate based on the translational motion estimate, the zoom estimate, and the rotation estimate.

9. The system of claim 1 wherein the system is embodied in a tangible medium of/for a computer.

10. The system of claim 9 wherein the tangible medium is a computer diskette.

11. The system of claim 9 wherein the tangible medium is a memory unit of the computer.

12. A method for estimating motion, comprising:
   A) segmenting, using a preprocessor, a current intensity frame to provide an object boundary estimate;
   B) adaptively estimating the motion from a previous intensity frame to the current intensity frame to provide a first DVF estimate, wherein DVF represents displacement vector field; and
   C) estimating motion boundaries based on the object boundary estimate and the first DVF estimate to provide a second DVF estimate and a first moving object boundary estimate.

13. The method for estimating motion according to claim 12, wherein:
   segmenting includes:

filtering, using an order statistics filter, the current intensity frame to remove noise and small objects from the current intensity frame;

region growing to group pixels into regions based on an adjustable window; and region merging to merge small regions based on a predetermined comparison test;

adaptively estimating the motion includes:

accessing a causal look-up table to provide at least one causal prediction coefficient and a causal uncertainty parameter based on the object boundary estimate;

storing previously estimated DVFs in a causal local neighborhood, the causal local neighborhood is set to a predetermined initialization before DVF estimation;

predicting a DVF based on the previously estimated DVFs and at least one causal prediction coefficient; and updating the predicted DVF to provide the first DVF estimate, the first DVF estimate is an input to the causal local neighborhood where it is stored as a previously estimated DVF; and estimating motion boundaries includes:

storing previously estimated DVFs in a noncausal local neighborhood, the noncausal local neighborhood is initialized by the first DVF estimate;

storing previously estimated moving object boundaries in a moving object boundary unit, the moving object boundary unit is initialized by the object boundary estimate;

estimating moving objects to provide a first moving object boundary estimate;

accessing a noncausal look-up table to provide at least one noncausal prediction coefficient and a noncausal uncertainty parameter based on the first moving object boundary estimate; and estimating a DVF to provide the second DVF estimate;

terminating the estimating step when an entire frame has been estimated, and passing the first moving object boundary estimate and the second DVF estimate upon termination.

14. The method of claim 12 wherein the steps of the method are embodied in a tangible medium of/for a Digital Signal Processor, DSP.

15. The method of claim 12 wherein the steps of the method are embodied in a tangible medium of/for an Application Specific Integrated Circuit, ASIC.

16. The method of claim 12 wherein the steps of the method are embodied in a tangible medium of/for a gate array.

17. The method for estimating motion according to claim 12, further comprising:

analyzing motion to provide a third DVF estimate and a second moving object boundary estimate based on the second DVF estimate and the first moving object boundary estimate.

18. The method for estimating motion according to claim 17, wherein:

analyzing motion includes:

determining a center to provide a region location and a center point;

estimating translational motion to provide a translational motion estimate;

estimating zoom to provide a zoom estimate;

estimating rotation to provide a rotation estimate; and fitting the translational motion estimate, the zoom estimate, and the rotation estimate to a predetermined model.

19. The method of claim 12 wherein the steps of the method are embodied in a tangible medium of/for a computer.

20. The method of claim 19 wherein the tangible medium is a computer diskette.

21. The method of claim 19 wherein the tangible medium is a memory unit of the computer.

22. A computing device having a system for estimating motion, comprising:

A) a preprocessor, operably coupled to receive a current intensity frame, for segmenting the current intensity frame to provide a first object boundary estimate;

B) a spatially adaptive motion estimator, operably coupled to the proprocessor and operably coupled to receive the current intensity frame and a previous intensity frame, for providing a first DVF estimate, wherein DVF represents displacement vector field; and C) a motion boundary estimator operably coupled to the spatially adaptive motion estimator and preprocessor and operably coupled to receive the current intensity frame and the previous intensity frame, for providing a second DVF estimate and a first moving object boundary estimate.

23. A video conferencing/video on demand device having a system for estimating motion, comprising:

A) a preprocessor, operably coupled to receive a current intensity frame, for segmenting the current intensity frame to provide a first object boundary estimate;

B) a spatially adaptive motion estimator, operably coupled to the proprocessor and operably coupled to receive the current intensity frame and a previous intensity frame, for providing a first DVF estimate, wherein DVF represents displacement vector field; and C) a motion boundary estimator operably coupled to the spatially adaptive motion estimator and preprocessor and operably coupled to receive the current intensity frame and the previous intensity frame, for providing a second DVF estimate and a first moving object boundary estimate.

* * * * *

UNITED STATES PATENT AND TRADEMARK OFFICE
CERTIFICATE OF CORRECTION

PATENT NO.   :   5,717,463
DATED        :   February 10, 1998
INVENTOR(S)  :   Brailean, James C. et al.

It is certified that error appears in the above-indentified patent and that said Letters Patent is hereby corrected as shown below:

On the front page:

Assignee: "Motorola, Inc., Schaumburg, Ill." should be
Assignee: --Motorola, Inc., Schaumburg, Ill. and
          Northwestern University, Evanston, Ill--

Signed and Sealed this

Thirtieth Day of June, 1998

Attest:

BRUCE LEHMAN

Attesting Officer

Commissioner of Patents and Trademarks